Nov. 26, 1968     E. I. GORDON     3,413,476
LIGHT BEAM CONTROLLING SYSTEM
Filed June 23, 1964     4 Sheets—Sheet 1
*FIG. IA*
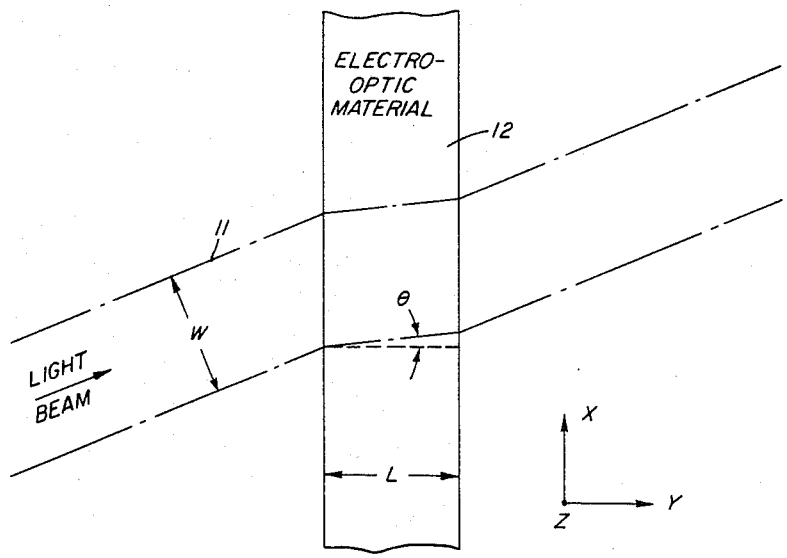
*FIG. IB*
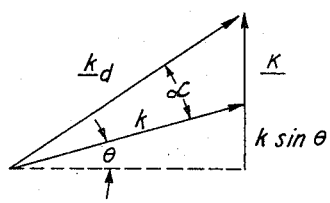
INVENTOR
*E. I. GORDON*
BY
*David P. Kelly*
ATTORNEY United States Patent Office 3,413,476
Patented Nov. 26, 1968

3,413,476
LIGHT BEAM CONTROLLING SYSTEM
Eugene I. Gordon, Convent Station, N.J., assignor to Bell Telephone Laboratories, Incorporated, New York, N.Y., a corporation of New York
Filed June 23, 1964, Ser. No. 377,353
11 Claims. (Cl. 250—199)

ABSTRACT OF THE DISCLOSURE

A light beam deflection system comprises a waveguide containing an electro-optic material. The waveguide has apertured sides to permit passage of a light beam through the material, and microwaves propagate through the material. The width of the light beam is greater than a microwave wavelength so that the material acts as a diffraction grating to deflect the light beam at an angle depending on the frequency of the microwaves.

---

This invention relates to beam deflection systems, and, more particularly, to optical beam deflection systems for use in memory, logic, switching and light modulation arrangements.

The advent of the optical maser, with its highly coherent optical frequency beam, has made possible enormous increases in the amount of information that can be transmitted by electromagnetic radiation and greatly increased speed in switching, logic and information storage and read-out operations. Efforts to utilize the full capacity of an optical beam in performing the above operations have, heretofore, been only partially successful. The transition from microwave to optical frequencies has, in large measure, necessitated the development of new techniques since current microwave techniques of modulation and the like are incapable of accomplishing the desired ends at optical frequencies.

Present day technology directed to deflecting light beams in general utilizes voltage controlled deflection. This places a severe limitation on accuracy, since both high voltages and precise voltage regulation are required to achieve accurate high speed deflection. In addition, where the electro-optic effect is utilized, large crystals of electro-optic material are necessary to insure efficient interaction between the modulating or deflecting voltage and the light beam and to eliminate resonance effects. In addition, the high dielectric constant, electro-optic materials place a limit on bandwidth and deflection speed. As a consequence, long interaction lengths and high powers are required. For accurate placement or pointing of the deflected beam, the beam incident upon the electro-optic material must be accurately aimed within very close tolerances, which necessarily demands close manufacturing tolerances.

In modulating a light beam, at the present time, in general, a modulated microwave carrier or subcarrier is placed upon the light beam. This necessitates the use of high frequency detectors which are not as reliable nor as efficient as low frequency detection devices.

Among the objects of the present invention are to produce light beam deflection and modulation electro-optically without the necessity of close tolerances, large crystals, low dielectric constants, long interaction lengths, high voltages, and critical voltage regulation.

It is another object of the present invention to produce baseband modulation of a light beam.

These and other objects of the present invention are achieved in a first illustrative embodiment of the invention wherein a microwave waveguide is filled with electro-optic material, such as potassium-tantalate-niobate (KTN) and has elongated apertures in its narrow walls providing an optical path through the KTN. A collimated beam of light is passed through a system of lenses which spread the beam in the direction of the longitudinal axis of the waveguide, giving the beam an elliptical cross section. The lenses direct the beam through the apertured wall of the waveguide into the electro-optic material. A microwave deflecting signal is propagated along the waveguide and through the electro-optic material. As will be explained more fully hereinafter, the microwave signal produces a moving variation in index of refraction of the electro-optic material, which is analogous to a moving diffraction grating. At least a portion of the light beam, as a consequence, is deflected into the first order deflection mode, the angle of deflection depending upon the frequency of the microwave signal.

The beam emerging from the waveguide has been deflected in one coordinate plane. This beam is directed through a series of lenses which impart to it an elliptical cross section with its major axis at right angles to the major axis of its first elliptical cross section. The beam is then directed through electro-optic material in a second waveguide at right angles to the first waveguide where it is deflected in a plane normal to the first plane of deflection. The emergent beam passes through a series of lenses which return it to its original circular cross section and focus it on to a matrix or memory plate. Changes in the frequency of the microwave signals in the waveguides changes the point of impingement, or "address" of the beam on the matrix. In addition, changes in microwave power change the intensity of the impinging beam.

In a second illustrative embodiment of the invention, in place of a system of lenses, prisms are mounted at the entrance and exit apertures of the waveguides, and the beam is directed onto the angular faces of the entrance prisms to produce a widening of the beam in a single plane. The beam, in exiting from the angular faces of the exit prisms, is returned to its original circular cross section.

In a third illustrative embodiment of the invention, only a single apertured waveguide propagating a modulating signal is utilized. A portion of the beam, in passing through the electro-optic material in the waveguide is deflected into the first grating order as will be explained more fully hereinafter, while a portion of the beam is undeflected. The emergent beam is reformed into a beam of circular cross section by a system of lenses or by prisms, and directed through an apertured plate. The aperture in the plate is so positioned and dimensioned that the undeflected portion of the beam passes through the aperture, while the deflected portion of the beam impinges upon the plate and does not pass through. Inasmuch as the intensity of the deflected portion of the beam varies directly as the intensity or amplitude of the microwave signal, the amplitude of the energy in the deflected portion follows the envelope of the microwave signal, while the undeflected portion of the beam varies in amplitude or intensity inversely as the microwave envelope. As a consequence, the intensity of the light beam passing through the aperture in the plate varies inversely as the microwave envelope. It can be seen, therefore, that the light beam is baseband modulated; that is, modulated with the intelligence signal and not with the microwave carrier.

These and other objects and features of the present invention will be more readily apparent from the following detailed description, taken in conjunction with the accompanying drawings, in which:

FIGS. 1a and 1b are diagrams of the behavior of a light beam in the present invention;

Figure 2:
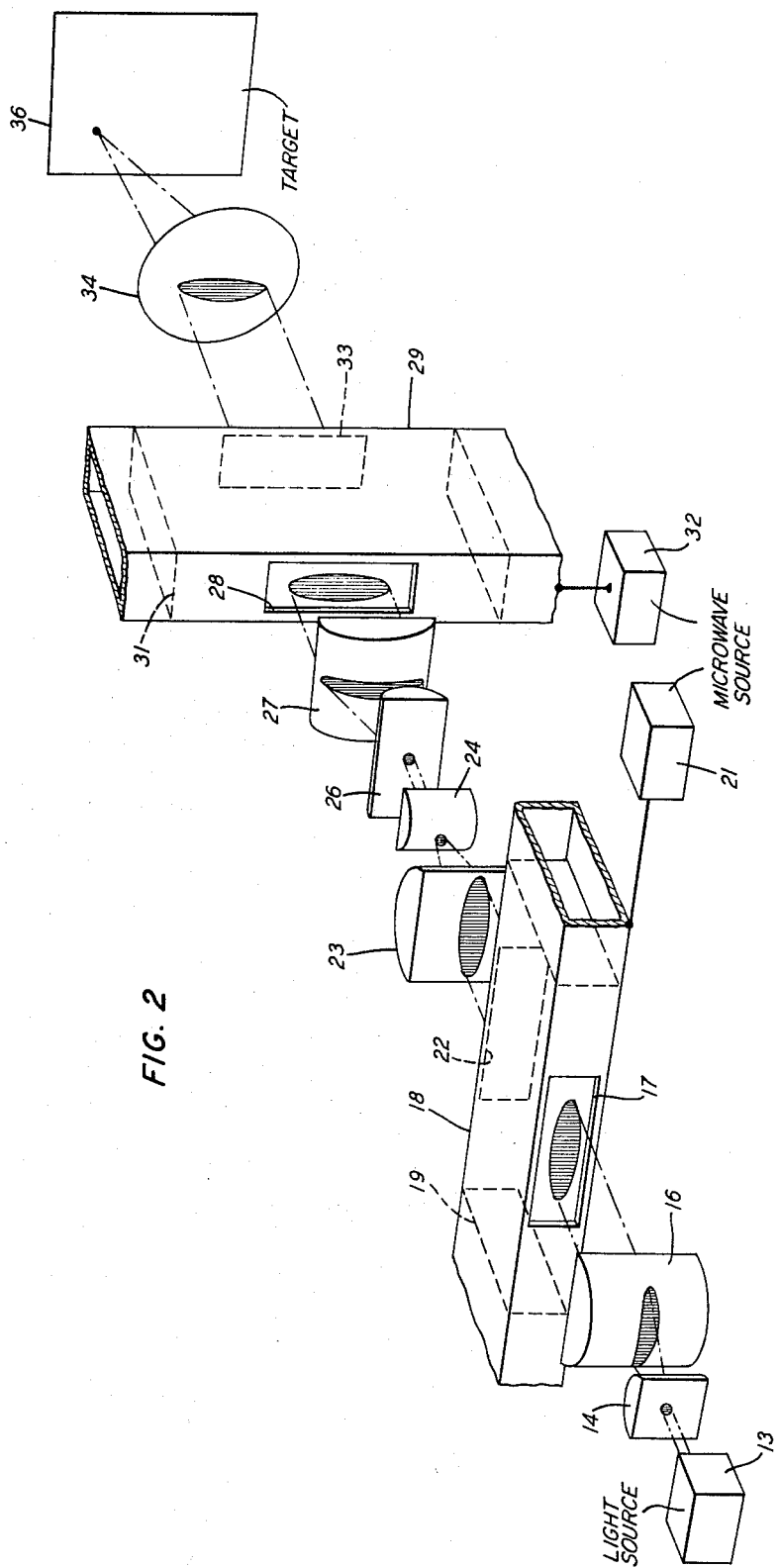
FIG. 2 is a perspective view of one illustrative embodiment of the invention.

Turning now to FIG. 1a, there is shown an idealized geometry for illustrating the basic principles of the present invention. A wide light beam 11 of width W and angular frequency $\omega$ is incident on an isotropic electro-optic material 12 having an index of refraction $n$ and a thickness L measured along the $y$ direction. The light is polarized in the $z$ direction and is propagated through the material 12 at an angle $\theta$ with respect to the $y$ axis. A microwave signal of angular frequency $\Omega$ and which is uniform in the $y$ and $z$ directions and polarized in the $z$ direction propagates through material 12 in the plus $x$ direction. The propagation constant of the light is denoted by $k$ and has a magnitude $k = \omega/c'$ where $c' = c/n$, $c$ being the light velocity in a vacuum. The propagation constant of the microwave is given by $K = \Omega/v$, where $v$ is the microwave phase velocity.

The electro-optic properties of the material 12 are such that for light with the specified polarization the traveling microwave field induces a variation in the optical index of refraction of material 12 which travels at the microwave phase velocity and has a frequency $\Omega$ or $2\Omega$ depending upon whether the electro-optic effect of the material 12 is linear or quadratic with the microwave field. Where the effect is quadratic, it can be made linear by application of the proper D.-C. bias, as is well known in the art. The traveling variation in index of refraction can be considered to be a moving diffraction grating and under appropriate conditions, light energy in beam 11 is deflected into various grating orders. At high microwave frequencies, where the beam width W exceeds the wavelength of the microwave signal, only the first grating order is excited strongly.

By judicious choice of the angle $\theta$, a large amount of energy is deflected. In particular, proper choice of $\theta$ satisfies the well-known Tien relations $$\omega_d = \omega \pm \Omega$$
$$k_d = k \mp K \quad (1)$$

where $\omega_d$ is the frequency of the deflected beam and $k_d$ is its propagation constant. Since the material 12 is isotropic, it follows that $$k_d = k\left(1 + \frac{\Omega}{\omega}\right) \quad (2)$$

From FIG. 1b it can be seen that, within the medium 12, the deflected beam makes an angle $\alpha$ with the original beam, defined by $$\tan(\alpha + \theta) = \tan \theta \pm K/k \cos \theta$$
$$= \tan \theta + \alpha/\cos^2 \theta + \alpha^2 \tan \theta/\cos^2 \theta \ldots \quad (3)$$

The second equality is a Taylor expansion of the left-hand side of the equation. In practice, the range of $K/k$ is limited to values small compared to unity so that equating the right-hand sides and neglecting terms of order $(K/k) \sin \theta \ll 1$ yields $$\alpha \cong \pm (K/k) \cos \theta = \pm (\Omega/\omega)(c/nv) \cos \theta \quad (4)$$

When the microwave frequency is varied over a range $\Delta\Omega$ with a fixed $\theta$, the range of deflected angles is $$\Delta\alpha = (\Delta\Omega/\omega)(c/nv) \cos \theta \quad (5)$$

It can be shown that the total number of resolvable points to which the beam may be focused beyond the region of material 12 is $$\Delta\alpha/\Delta\Phi \cong (\Delta\Omega 2\pi)\tau \cos^2 \theta \quad (6)$$

where $\tau = W/v \cos \theta'$ and $\cos \theta' = (1 - n^2 \sin^2 \theta)^{1/2}$. $\tau$ is the approximate transit time of the microwave signal across the optical beam. $\tau$ also represents the minimum time in which the microwave signal frequency can be changed to produce a new deflection angle. From Equation 6, therefore, it can be seen that there are approximately $\Delta f \tau$ memory positions or bits with an access time of order $\tau$, where $\Delta f = \Delta\Omega/2\pi$. When two such deflective arrangements are combined in series, at right angles to each other, thereby forming a square array of addresses or memory positions, the total number of bits becomes $$N \cong (\rho \Delta f \tau \cos^2 \theta)^2 \quad (7)$$

where $\rho$ is unity for a linear electro-optic effect and two for a quadratic effect. As a numerical example, assume an optical beam of width $W = 10$ cm., and a microwave dielectric constant for material 12 of $10^4$. From this, $v = 3 \times 10^8$ cm./sec., and $\tau = 3.4 \times 10^{-8}$ sec. In a range of frequencies near 50 kmc., a value of $\Delta f$ as large as $10^{10}$ c.p.s. is available from a single backward wave oscillator. For this case $N \cong 1.1 \times 10^5$ bits (for $\rho = 1$ and $\cos \theta \cong 1$) with an address time per bit of approximately $10^{-7}$ sec. Such an access time is considerably faster than present day arrangements.

The deflected light beam contains sufficient power to permit it to be split into a number of channels, thereby increasing the total memory store. In practice, crosstalk limits, to some extent, the total number of bits, and, in order to insure positioning of the beam at the proper address, the actual address time is somewhat greater than the access time $\tau$.

In FIG. 2, there is shown, for purposes of illustrating the invention, an information storage system utilizing the deflection arrangement of the present invention.

The system of FIG. 2 comprises a source 13 of a collimated light beam. Source 13 may be any one of a number of devices, but preferably is an optical maser, because of the spatial coherence or brightness of the light output of such devices. The beam from source 13 is directed into a lens system comprising first and second cylindrical lenses 14 and 16, the output of which is a collimated light beam directed through an aperture 17 in one wall of an apertured electromagnetic waveguide 18. Within waveguide 18 is a block 19 of electro-optic material, such as potassium-tantalate-niobate (KTN) or other suitable material. As pointed out in the foregoing, some materials have a linear electro-optic effect and some have a quadratic effect. In the case of the quadratic effect materials, a linear effect can be obtained by suitable D.-C. biasing means, as is well known in the art. Because such means are well known, no D.-C. biasing means has been shown.

A microwave deflecting signal from a source 21 is propagated through waveguide 18 and the material 19 as set forth in the foregoing analysis. Source 21 may take any one of a number of forms. It may be, for example, a backward wave oscillator, the output of which is a microwave carrier frequency modulated with the address or word information. As explained before, the light beam, in passing through material 19 has a portion of its energy deflected in the plane of the major axis of its elliptical cross section. In order that this energy be deflected into the first grating order the major axis dimension of the elliptical light beam is greater than the maximum wavelength of the frequency modulated microwave signal. The actual amount or degree of deflection which takes place is quite small so that the beam emerging from the exit aperture 22 of the waveguide 18 is virtually unchanged in external dimensions and direction of propagation.

The beam, after exiting from waveguide 18, passes through a first system of cylindrical lenses 23 and 24 which returns it to its original circular cross section shape, and then through a second system of cylindrical lenses 26 and 27 which produces an elliptical cross section beam having a major axis oriented at right angles to the major axis of the beam's first elliptical cross section. The elliptical beam is directed through an aperture 28 in one wall of an apertured waveguide 29. Within waveguide 29 is a block 31 of electro-optic material, such as KTN. A microwave deflecting signal from a source 32 is propagated through waveguide 29 and material 31, as set forth in the foregoing. As with source 21, source 23 may take any one of a number of suitable forms, such as a backward wave oscillator. The light beam, in passing through the material 31 is deflected in a plane parallel to the major axis of the elliptical cross section in a manner discussed in the foregoing so that the elliptical light beam emerging from an exit aperture 33 has been deflected in two orthogonal planes.

The emergent beam is directed through a lens system 34, shown in FIG. 2 as a single lens but which may contain a plurality of lenses. Lens system 34 functions at least in part as a telephoto lens system which focuses the beam to a point on a matrix array 36. Member 36 may comprise an array of light sensitive storage devices, an array of photosensitive switching elements, a coding plate, or any one of a number of kinds of devices, depending upon the particular use or application of the deflection system.

In the embodiment of FIG. 2, the light beam is shown passing through the electro-optic materials at right angles to the direction of propagation of the microwave signal. In certain cases, in order that the angle $\theta$ may be optimized, and depending upon the material used, the beam may more advantageously be directed into the waveguide at an angle. The system of FIG. 2 can obviously be modified to accomplish this by a simple reorientation of the geometry of the system, without any change in the basic operation as described.

Figure 3:
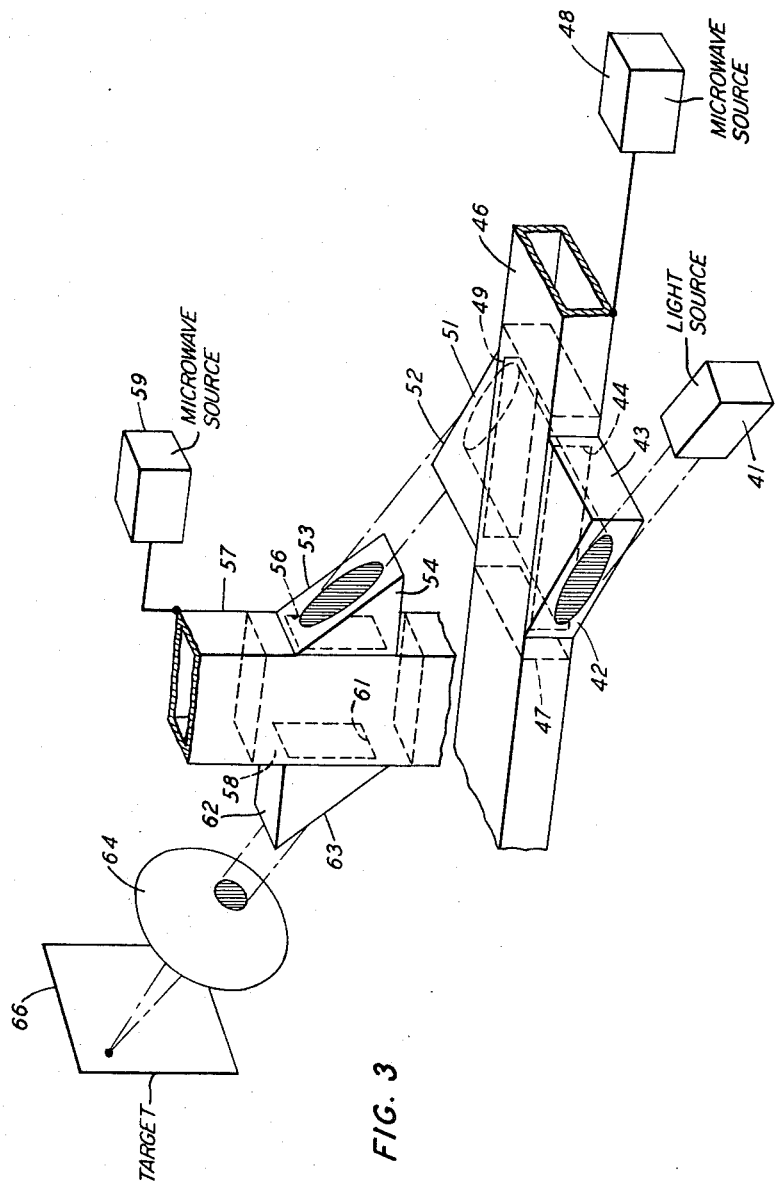
FIG. 3 is a perspective view of a second illustrative embodiment.

In FIG. 2, the principles of the invention are illustrated in a system wherein lenses are utilized to shape and direct the beam, and such lens systems necessarily entail the use of a number of lens components. In FIG. 3, there is shown an arrangement wherein lenses are virtually eliminated except for the final beam focusing stage. The deflection system of FIG. 3 comprises a source 41 of collimated light beam, which source is, as pointed out before, preferably an optical maser. The light beam from a source 41 is directed at an angle onto the hypotenuse face 42 on a right-angle prism 43. To minimize reflection, face 42 is preferably coated with a suitable antireflection coating. As can be seen, the shape of the beam impinging on the face 42 is elliptical in cross section. The refractive index of prism 43 is such that this elliptical beam is passed through an aperture 44 on one wall of an aperture waveguide 46. Within waveguide 46 is a block of electro-optic material 47 through which the beam passes. A source 48 of a microwave deflection signal directs microwave energy through the waveguide 46 and the material 47 thereby deflecting a portion of the energy in the beam, as explained in the foregoing. The beam exits through an exit aperture 49 into a second right-angle prism 51. The beam leaves prism 51 through the hypotenuse face 52 which has been coated with antireflection material. The beam leaving face 52 is directed in the manner shown, and is circular in cross section. This beam is then directed at an angle onto a face 53 of a right-angle prism 54 oriented as shown and is directed by prism 54 through an aperture 56 in an aperture waveguide 57 having a block of electro-optic material 58 therein through which the now elliptical beam passes. A source 59 of microwave deflecting signals supplies waveguide 57 with microwave energy which passes through the material 58 and deflects the beam in a manner set forth in the foregoing. The deflected beam exits from the waveguide through an aperture 61 into the right-angle prism 62 and exits from the prism 62 through its hypotenuse 63. Thus, the beam is once again circular in cross section, but contains the orthogonally oriented deflection components introduced by the microwave signals from the source 48 and 59. The beam is directed through a lens system 64, shown in FIG. 3 as a single telescopic lens but which, of course, may comprise a number of lenses which focus the beam and direct it to the correct address on an array plate 66. From the foregoing, it can be seen that the use of right-angle prisms accomplishes the dual function of imparting an elliptical cross section to a circular beam and of imparting a circular cross section to an elliptical beam. Because of its simplicity, the use of such prisms is highly advantageous in many applications.

From the foregoing, it can readily be seen that the present invention produces light beam deflection of a manner and with a structure, or structures, which obviate the necessity of close manufacturing tolerances and large crystals entailing long interaction lengths. In addition, the characteristics of the materials used are such that there is no dependence on a low dielectric constant for beam deflection, nor are high voltages, or critical voltage regulation necessary.

Thus far, the principles of the present invention have been illustrated in their application to memory or logic systems. These principles are readily applicable to amplitude modulation systems, and especially to baseband amplitude modulation.

In most light modulation schemes, the fundamental modulation process produces phase or polarization modulation of the light which generally must be converted to amplitude or intensity modulation prior to detection. The present invention, on the other hand, produces amplitude modulation directly. When energy is deflected from the main or zero order beam into one of the grating orders by a microwave signal, the intensity of the main beam is decreased, the amount of the decrease being proportional to the microwave power. As a consequence, an amplitude modulated microwave subcarrier produces an amplitude modulated main beam. Thus, the modulation is at baseband, there being no subcarrier components on the main beam.

Figure 4:
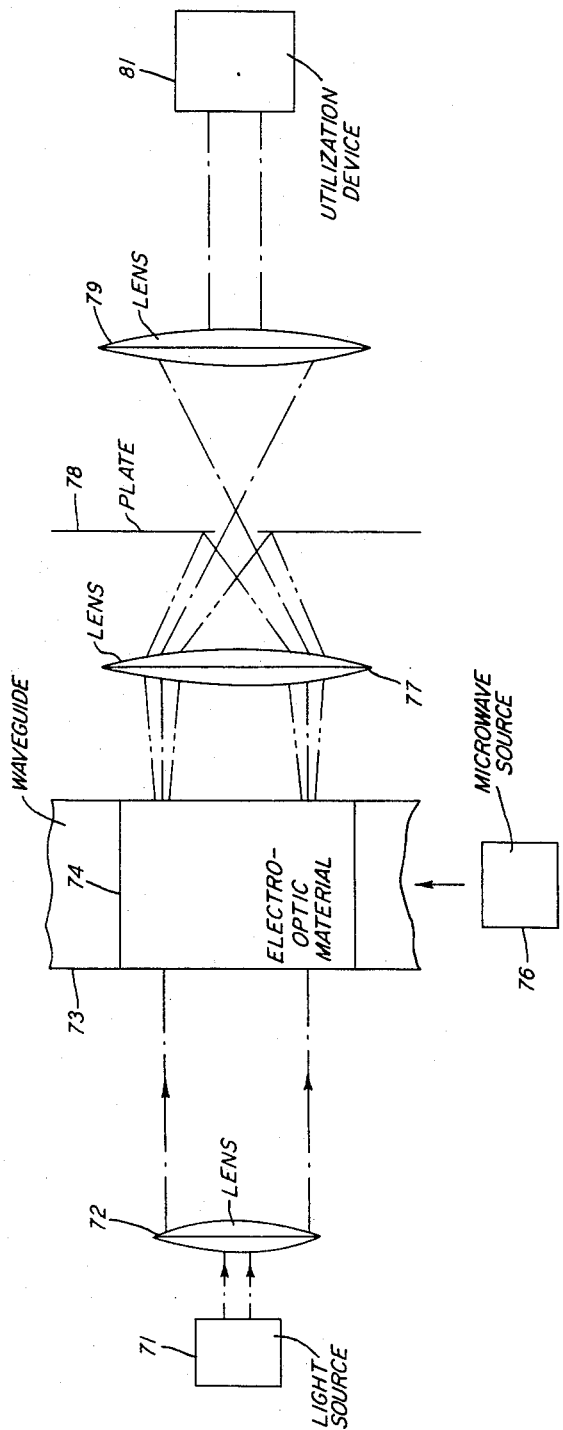
FIG. 4 is a schematic view of a light modulation system utilizing the principles of the present invention.

In FIG. 4, there is shown schematically a modulation arrangement utilizing the principles of the present invention to produce baseband amplitude modulation of a light beam. The system of FIG. 4 comprises a light beam source 71 which directs a beam of light into a lens system 72, shown schematically as a single lens, but which may be a number of lenses and/or prisms, which produces a collimated beam of elliptical cross section, as was done in the embodiments of FIGS. 2 and 3. The elliptical beam is directed through one wall of a waveguide 73 and into a member of electro-optic material 74. A modulating signal from a source 76 is propagated along waveguide 73 and through member 74. Source 76 may take any one of a number of forms, for example, a backward wave oscillator or klystron producing an amplitude modulated microwave signal.

As explained in the foregoing, the effect of the microwave signal in the material of member 74 is to produce a moving diffraction grating which deflects the light beam, the amount of energy deflected being dependent on the amplitude of the deflecting signal. As a consequence, the beam emerging from waveguide 73 has energy components in its fundamental or zero grating order and in its plus and minus first orders. The amount of energy in the zero order varies inversely with the amplitude of the modulating signal. The emergent beam passes through a lens systems 77 which focuses it to a point, the focal points of the first order modes being displaced from the focal point of the zero order mode, as shown. An apertured plate 78, placed at the focal plane, passes the zero order beam and blocks passage of the higher orders. Thus, the light passing through the aperture in plate 78 is an amplitude modulated zero order beam. This beam is directed through a lens system 79 which produces a collimated modulated beam. The modulation system is completed by a utilization device 81 into which the beam is directed. Device 81 may be any one of a number of devices, such as an amplifier for amplifying the light for transmission, or a photodetector for detecting the modulations on the beam. The detector may be, as pointed out in the foregoing, a low frequency detector, which is much more reliable and efficient than a microwave detector. The use of a low frequency detector is made possible because of the baseband modulation, there being no microwave components on the beam.

In all of the foregoing, the principles of the invention were shown in microwave arrangements using the electro-optic effect. The principles of the invention are adaptable for use with any type of wave which can produce a variation in the index of refraction of the material.

Numerous other applications of the principles of the present invention may occur to workers in the art without departing from the spirit and scope thereof.

What is claimed is:

1. A light beam deflecting arrangement comprising a waveguide member containing electro-optic material and having side walls that are transparent to light to permit passage of light through said electro-optic material, means for directing a beam of light through the transparent side walls of said waveguide, means for deflecting at least a portion of said beam into a first diffraction grating order comprising means for introducing microwave signals into said waveguide, the transverse dimension of said beam in the direction of wave propagation being several wavelengths long at the microwave frequency, and means responsive to changes in the deflection of said light beam.

2. A light beam deflecting arrangement as claimed in claim 1 wherein said electro-optic material is potassium-tantalate-niobate (KTN).

3. A light beam deflecting arrangement comprising a waveguide member containing electro-optic material, the side walls of said waveguide having apertures adjacent said material to provide a straight through optical path, a light beam source, means for imparting to the light beam an elongated cross section and directing it through one of said apertures in the waveguide wall with the longer dimension substantially parallel to the longitudinal axis of the waveguide, said last-mentioned means comprising a prism adjacent said aperture, means for deflecting at least a portion of said beam into a first diffraction grating order comprising means for introducing microwave signals into said waveguide, the transverse dimension of said beam in the direction of wave propagation being several wavelengths long at the microwave frequency, means for returning said beam to substantially its original shape comprising a prism adjacent the aperture in said waveguide through which said beam exits, and means for utilizing said beam.

4. A light beam deflecting arrangement as claimed in claim 3 wherein said means for introducing a microwave signal into said waveguide includes means for producing a frequency modulated microwave signal.

5. A light beam deflecting arrangement as claimed in claim 3 wherein said means for introducing a microwave signal into said waveguide includes means for producing an amplitude modulated microwave signal.

6. A light beam deflecting arrangement comprising a waveguiding member containing a wave transmitting material, said material being characterized by an index of refraction which varies with the frequency of waves transmitted therethrough, said waveguiding member being transparent to light over a portion of its length to permit passage of light through said material, said material being several wavelengths long at the frequency of waves propagating in said waveguiding member, means for introducing a light beam into said material through the transparent portion of said waveguiding member at an angle to the direction of propagation of waves in said member, said light beam having a transverse dimension in the direction of wave propagation that is greater than a wavelength of the waves propagating in said waveguide, means for establishing a traveling wave of index of refraction change in said material to deflect at least a portion of the light beam into the first diffraction grating order comprising means for introducing waves into said waveguiding member for travel therealong, the angle of deflection of said beam being dependent on the frequency of said waves, and means for utilizing the light beam emerging from said waveguiding member.

7. A light beam modulating arrangement comprising a waveguide member containing electro-optic material and having side walls that are transparent to light to permit passage of light through said electro-optic material, means for directing a beam of light through the transparent side walls of said waveguide, means for deflecting varying amounts of energy in said light beam into a first diffraction grating order comprising means for introducing amplitude modulated microwave signals into said waveguide, the transverse dimension of said beam in the direction of wave propagation being several wavelengths long at the microwave frequency, and means responsive to variations in the amplitude of a portion of the light beam emerging from said waveguide.

8. A light beam modulating arrangement as claimed in claim 7 wherein the utilizing means comprises a low frequency photodetector.

9. A light beam scanning system comprising first and second waveguide members each containing electro-optic material and having side walls that are transparent to light to permit passage of light through said electro-optic material, said waveguides having their longitudinal axes oriented at right angles to each other, means for directing a beam of light through the transparent walls of said first waveguide with an elliptical cross section, the major axis of the ellipse extending approximately in the direction of the longitudinal axis of said first waveguide, means for directing the light beam emerging from said first waveguide through the transparent walls of said second waveguide with an elliptical cross section, the major axis of the ellipse extending approximately in the direction of the longitudinal axis of said second waveguide, means for deflecting at least a portion of the beam in a first plane comprising means for introducing a microwave signal into said first waveguide for propagation through the electro-optic material therein, means for deflecting at least a portion of the beam in a second plane normal to the first plane comprising means for introducing a microwave signal into said second waveguide for propagation through the electro-optic material, the wavelength of the microwave signals in said first and second waveguides being less than the length of the major axis of the elliptical beam in the waveguides, and means for focusing the beam emerging from said second waveguide onto a utilization device.

10. A light beam scanning arrangement as claimed in claim 9 wherein the means for introducing microwave signals into each of said waveguides include means for producing microwave signals frequency modulated in accordance with deflecting signals.

11. A light beam scanning arrangement as claimed in claim 9 wherein the first means for directing the light beam into said first waveguide includes a prism adjacent one transparent side wall thereof and the means for directing the light beam into said second waveguide includes a prism adjacent one transparent side wall thereof.

References Cited

UNITED STATES PATENTS 3,290,619   12/1966   Geusic _____ 250—199
3,177,770   4/1965    Okaya _____ 250—199 X ROBERT L. GRIFFIN, *Primary Examiner.*

A. J. MAYER, *Assistant Examiner.*